Patented Jan. 13, 1931

1,788,838

UNITED STATES PATENT OFFICE

HERMANN LANG, OF BITTERFELD, GERMANY, ASSIGNOR TO I. G. FARBENINDUSTRIE AKTIENGESELLSCHAFT, OF FRANKFORT-ON-THE-MAIN, GERMANY

CONDENSATION OF PHOSPHORUS

No Drawing. Application filed April 20, 1927, Serial No. 185,352, and in Germany February 26, 1926.

Corresponding applications were filed in the name of the I. G. Farbenindustrie Aktiengesellschaft of Frankfort on the Main, Germany, in Germany, Feb. 26, 1926; Russia, Sept. 8, 1926; Austria, March 4, 1927; Switzerland, April 4, 1927; Norway, April 6, 1927; Sweden, April 6, 1927.

This invention relates to improvements in the production of phosphorus, more especially to the separation of phosphorus from gases containing this element.

When producing phosphorus from phosphates, silicic acid and carbon in an electric furnace, the resulting volatile reaction products substantially consist, after the removal of foreign matter, of carbon monoxid and phosphorus vapor, the quantity of the latter amounting to about 400 grams per cubic meter. On progressive cooling-down the gaseous mixture begins, as soon as the temperature sinks below the dew-point, to separate phosphorus in the form of a fog which, however, slowly settles and shows little tendency towards the formation of larger drops of liquid phosphorus. Therefore relatively extensive cooling-surfaces in the condensing plant are required from which, however, even after complete cooling-down, in any case still considerable amounts of phosphorus fogs escape together with carbon monoxid. Even by irrigating the cooling-surfaces with water the condensation of the fog is not accelerated to any great extent.

Now I have found that the condensation of the fog is extraordinarily promoted and therefore may be effected in condensers of far smaller dimensions than heretofore used, by making drops of liquid strike upon the particles of the fog, thereby producing an intimate contact resulting in the formation of an emulsion or suspension. For this purpose centrifugal devices or intense mixing devices are especially adapted in which a rapid movement of liquid drops is produced by a rotating member, said liquid being held in continuous circulation. Devices of the first-named kind are, for example, the so-called centrifugal washers, such as the "Theisen" or "Ströder" washer.

As precipitants water or watery solutions, for instance solutions of acids, or organic liquids or even liquid phosphorus itself may be employed. With the above cited mechanical means and liquids, the waste gases are rapidly freed from their phosphorus contents up to the amount which corresponds to the vapor tension of phosphorus at the working-temperature, so that no more phosphorus fog is present.

In the condensing operation preferably two or more condensers or systems of condensers are employed for washing the gases with water or watery solutions, one part of the washers, for instance one washer, being fed with water the temperature of which is kept a little above the fusion-point of phosphorus whereas the other part, consisting, for instance, of two elements, is fed with as cold a solution as possible.

The precipitated phosphorus collects as a uniform liquid mass beneath the washing solution and may be withdrawn without difficulty. Hereafter only 1 gram of phosphorus per cubic meter is left in the vapor which is now condensed and precipitated in a second washer, whereby a suspension of phosphorus having a milky aspect is obtained. On heating this phosphorus milk above the fusion point of phosphorus, after the liquid has been sufficiently enriched, the particles easily unite to liquid phosphorus.

I claim :—

1. Process for condensing the phosphorus contents of gases or vapours which consists in submitting said gases or vapours at a temperature below the dew point of phosphorus to the action of rapidly moving finely divided drops of liquid, the subdivision of said liquid and the velocity of said drops being sufficient to produce an emulsion of the phosphorus with said liquid.

2. Process for condensing the phosphorus contents of gases or vapours which consists in submitting said gases or vapours at a temperature below the dew point but above the melting point of phosphorus to the action of rapidly moving finely divided drops of liquid, said movement and subdivision being produced and sustained by mechanical means, and subjecting the gases or vapours issuing from this procedure to a similar treatment over again at a temperature below the melting point of phosphorus.

In testimony whereof I affix my signature.

HERMANN LANG.